(12) United States Patent
Almonte

(10) Patent No.: US 6,505,354 B1
(45) Date of Patent: Jan. 14, 2003

(54) URINAL

(76) Inventor: Luis Almonte, 3952 Seton Ave. 2nd Floor, Bronx, NY (US) 10466

( * ) Notice: Subject to any disclaimer, the term of this patent is extended or adjusted under 35 U.S.C. 154(b) by 0 days.

(21) Appl. No.: 10/177,278

(22) Filed: Jun. 21, 2002

(51) Int. Cl.[7] ............................................. A47K 11/00
(52) U.S. Cl. ................................. 4/144.1; 4/450; 4/457; 4/458
(58) Field of Search ......................... 4/144.1, 450, 454, 4/457, 458, 114.1

(56) References Cited

U.S. PATENT DOCUMENTS

| | | | | |
|---|---|---|---|---|
| 727,949 | A | * 5/1903 | Hoffman | 4/450 |
| 1,251,311 | A | * 12/1917 | Welsh | 4/450 |
| 1,251,877 | A | * 1/1918 | Erickson | 4/450 |
| 2,687,534 | A | * 8/1954 | Johnson | 4/144.1 |
| 3,172,130 | A | * 3/1965 | Lange | 4/144.1 |
| D220,413 | S | 4/1971 | Pesce | |
| 4,117,845 | A | * 10/1978 | Brown | 4/144.1 |
| 4,164,795 | A | 8/1979 | Johnson | |
| 4,309,779 | A | 1/1982 | Knight | |
| 4,422,188 | A | 12/1983 | Strutton et al. | |
| 4,665,571 | A | 5/1987 | Muccione | |
| D370,975 | S | * 6/1996 | Mohr | 4/144.1 |
| 5,848,443 | A | 12/1998 | Waugh | |
| 6,070,275 | A | * 6/2000 | Garlock | 4/144.1 |
| 6,212,691 | B1 | * 4/2001 | Heberer | 4/144.1 |

FOREIGN PATENT DOCUMENTS

| | | | | |
|---|---|---|---|---|
| DE | 603 404 | * | 2/1934 | 4/144.1 |
| DE | 3150 679 A | * | 6/1983 | 4/144.1 |
| FR | 1 199 644 | * | 12/1959 | 4/144.1 |

* cited by examiner

*Primary Examiner*—Charles R. Eloshway

(57) ABSTRACT

A urinal for collecting urine from a user while the user is driving. The urinal includes a housing comprising a perimeter wall. The perimeter wall defines an interior space of the housing. The interior space of the housing comprises an open top end. The open top end of the interior space is designed for permitting insertion of the penis of the user, and the scrotum if necessary, into the interior space of the housing when the user needs to urinate whereby the interior space of the housing is for collecting and storing the urine. A lid member is hingably coupled to the housing. The lid member is for selectively pivoting over the open top end of the interior space of the housing to close the open top end for inhibiting leakage from the interior space of the housing.

5 Claims, 3 Drawing Sheets

URINAL

BACKGROUND OF THE INVENTION

1. Field of the Invention

The present invention relates to bed urinals and more particularly pertains to a new urinal for collecting urine from a user while the user is driving.

2. Description of the Prior Art

The use of bed urinals is known in the prior art. U.S. Pat. No. 4,422,188 describes a device for converting a male bed urinal for female use. Another type of bed urinal is U.S. Pat. No. 4,665,571 having a molded container with hollow neck and mouth for receiving urine. U.S. Pat. No. 4,164,795 has a urinal with an inlet tube that will not discharge the contents of the urinal when the urinal contains urine. U.S. Pat. No. 4,309,779 has a urinal having a spout for being used by either a male or female. U.S. Pat. No. 5,848,443 has a potable bowl for being sat upon by the user while seated in the seat of a vehicle with an elevated flushing solution container for flushing urine in the portable bowl into a disposable collecting bladder. U.S. Pat. No. Des. 220,413 shows a urinator assembly.

SUMMARY OF THE INVENTION

An object of the present invention is to provide a new urinal that receives and stores from a user driving a vehicle To this end, the present invention generally comprises a housing comprising a perimeter wall. The perimeter wall defines an interior space of the housing. The interior space of the housing comprises an open top end. The open top end of the interior space is designed for permitting insertion of the penis of the user, and the scrotum if necessary, into the interior space of the housing when the user needs to urinate whereby the interior space of the housing is for collecting and storing the urine. A lid member is hingably coupled to the housing. The lid member is for selectively pivoting over the open top end of the interior space of the housing to close the open top end for inhibiting leakage from the interior space of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
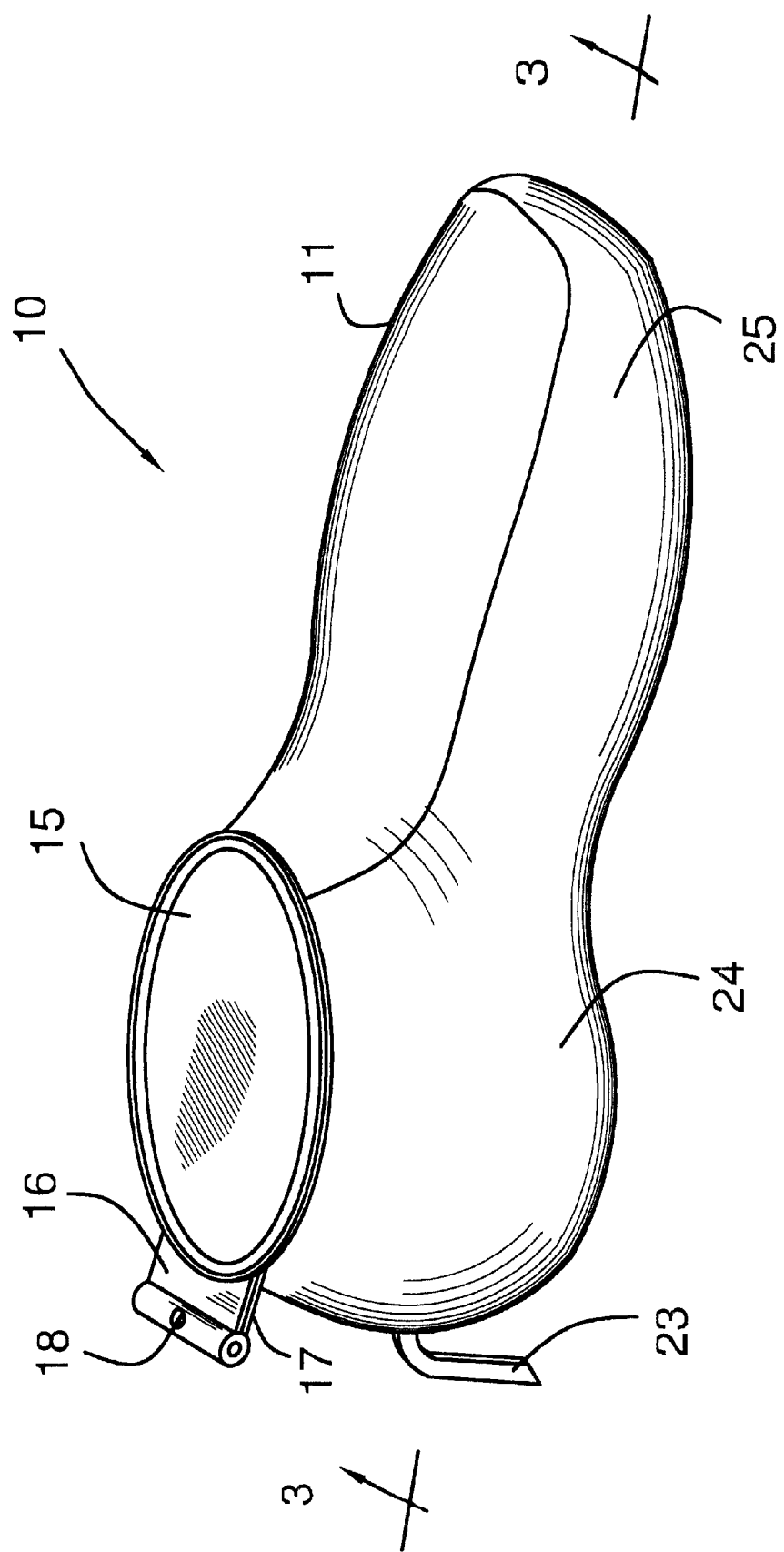
FIG. 1 is a perspective view of a new urinal according to the present invention.
Figure 2:
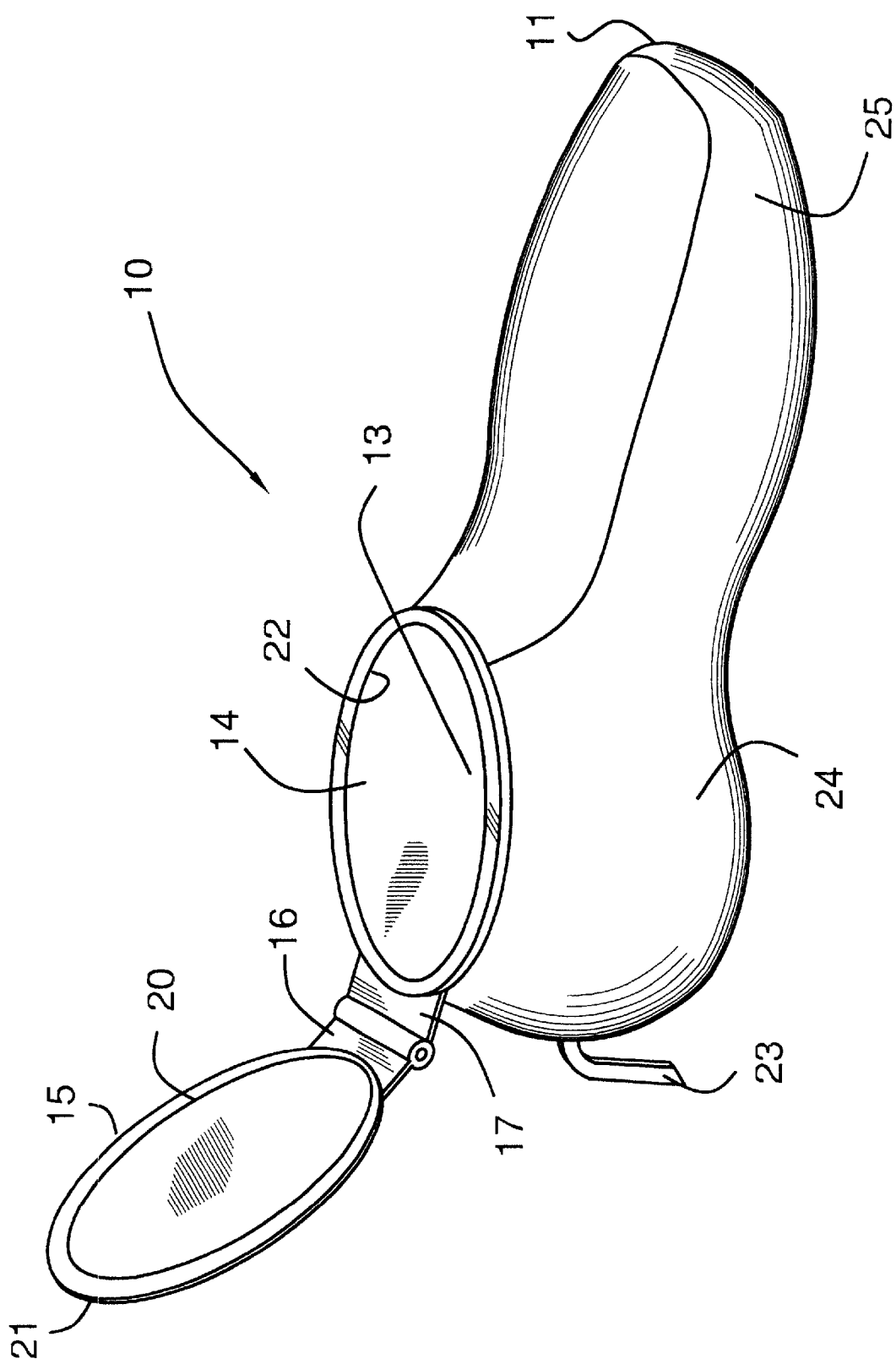
FIG. 2 is a perspective view of the present invention with the lid member pivoted away from housing.
Figure 3:
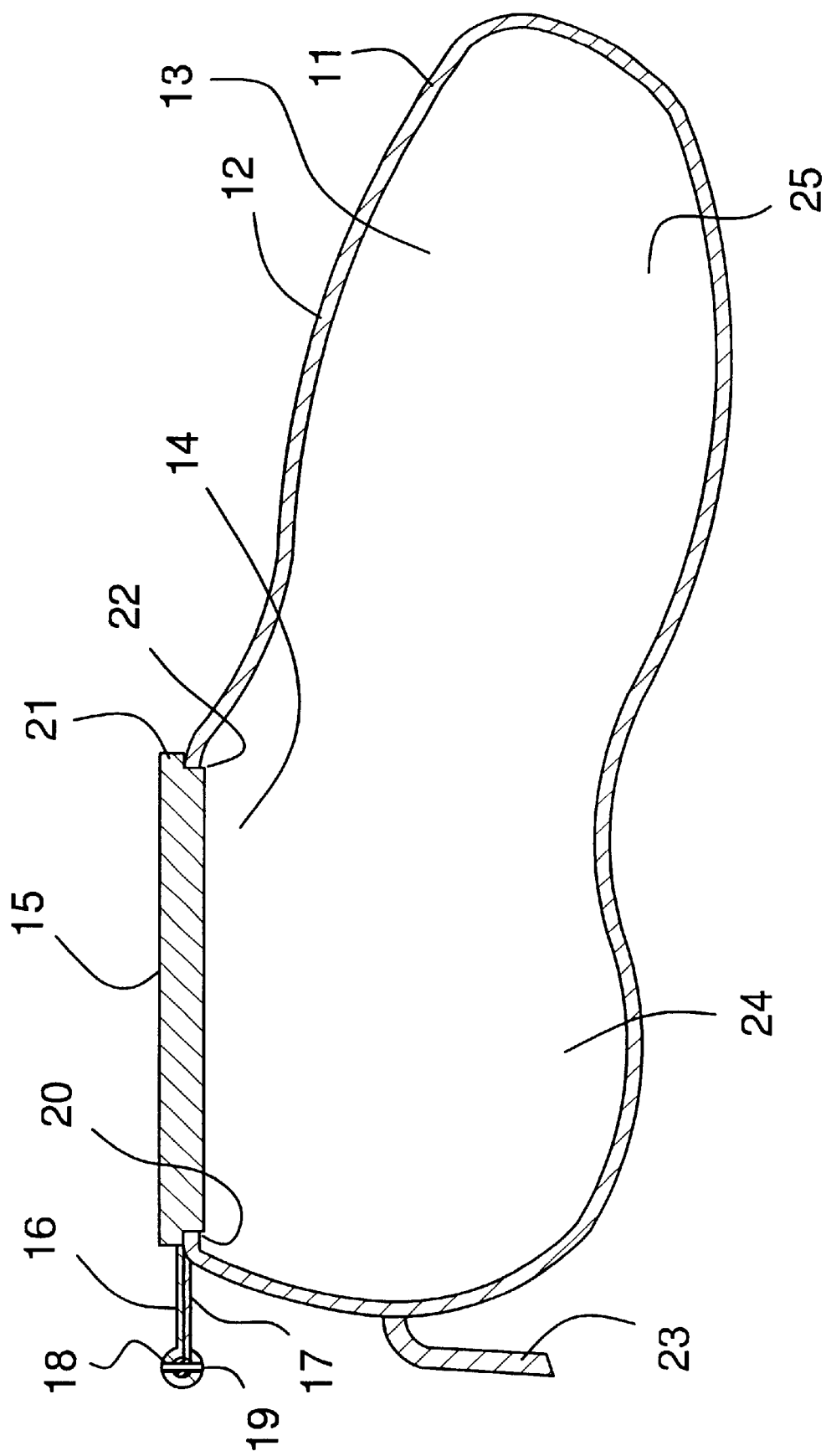
FIG. 3 is a cross-sectional view of the present invention taken along line 3—3 of FIG. 1.

With reference now to the drawings, and in particular to FIGS. 1 through 3 thereof, a new urinal embodying the principles and concepts of the present invention and generally designated by the reference numeral 10 will be described.

As best illustrated in FIGS. 1 through 3, the urinal 10 generally comprises a housing 11 comprising a perimeter wall 12. The perimeter wall 12 defines an interior space 13 of the housing 11. The interior space 13 of the housing 11 comprises an open top end 14. The open top end 14 of the interior space 13 is designed for permitting insertion of the penis of the user, and the scrotum if necessary, into the interior space 13 of the housing 11 when the user needs to urinate whereby the interior space 13 of the housing 11 is for collecting and storing the urine.

A lid member 15 is hingably coupled to the housing 11. The lid member 15 is for selectively pivoting over the open top end 14 of the interior space 13 of the housing 11 to close the open top end 14 for inhibiting leakage from the interior space 13 of the housing 11.

A lid tab 16 is coupled to the lid member 15. A housing tab 17 is coupled to the housing 11 adjacent the open top end 14 of the interior space 13 of the housing 11. The lid tab 16 is hingably coupled to the housing tab 17 whereby the lid member 15 is pivotal away from the housing 11 for facilitating access to the open top end 14 of the interior space 13 of the housing 11.

The lid tab 16 comprises a first aperture 18 extending through the lid tab 16. The housing tab 17 comprises a second aperture 19 extending through the housing tab 17. The first aperture 18 is aligned with the second aperture 19 when the lid member 15 is positioned over the open top end 14 of the interior space 13 of the housing 11 whereby the first aperture 18 and the second aperture 19 are designed for receiving a hanging member for facilitating storage of the housing 11.

The lid member 15 comprises a shoulder 20. The shoulder 20 is positioned inwardly from an outer peripheral edge 21 of the lid member 15. The shoulder 20 of the lid member 15 is for frictionally engaging an interior surface 22 of the open top end 14 of the interior space 13 of the housing 11 for inhibiting inadvertent pivoting of the lid member 15 with respect to the housing 11 when the lid member 15 is positioned over the open top end 14 of the housing 11.

A handle member 23 is coupled to the housing 11. The handle member 23 is positioned proximate the lid member 15. The handle member 23 is designed for being gripped by a hand of the user for facilitating moving and positioning of the housing 11.

The housing 11 comprises a bulbous portion 24 and a tapered portion 25. The open top end 14 of the interior space 13 of the housing 11 is positioned in an upper portion of the bulbous portion 24 of the housing 11. The bulbous portion 24 of the housing 11 is designed for receiving the scrotum of the user when the penis and the scrotum of the user are inserted into the interior space 13 through the open top end 14 of the interior space 13. The tapered portion 25 is designed for being positioned between the legs of the user when the user is urinating into the interior space 13 of the housing 11.

In use, the user grips the handle member 23 and pivots the lid member 15 away from the open top end 14 of the interior space 13. The bulbous end of the housing 11 is then positioned under the scrotum of the user and the penis and if necessary the scrotum are inserted into the interior space 13 of the housing 11 through the open top end 14 of the interior space 13. The user then proceeds to urinate. Upon completion of urination the user removes the housing 11 from between the legs and stores until the urine can be disposed of.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A urinal for collecting urine from a user while the user is driving, the urinal comprising:

a housing comprising a perimeter wall, said perimeter wall defining an interior space of the housing, said interior space of said housing comprising an open top end, said open top end of said interior space being adapted for permitting insertion of the penis of the user into said interior space of said housing when the user needs to urinate such that said interior space of said housing is for collecting and storing the urine; and a lid member being hingably coupled to said housing, said lid member being for selectively pivoting over said open top end of said interior space of said housing to close said open top end for inhibiting leakage from said interior space of said housing; and a lid tab being coupled to said lid member, a housing tab being coupled to said housing adjacent said open top end of said interior space of said housing, said lid tab being hingably coupled to said housing tab such that said lid member is pivotal away from said housing for facilitating access to said open top end of said interior space of said housing;

said lid tab comprising a first aperture extending through said lid tab, said housing tab comprising a second aperture extending through said housing tab, said first aperture being aligned with said second aperture when said lid member is positioned over said open top end of said interior space of said housing such that said first aperture and said second aperture are adapted for receiving a hanging member for facilitating storage of said housing.

2. The urinal as set forth in claim 1, further comprising:

said lid member comprising a shoulder, said shoulder being positioned inwardly from an outer peripheral edge of said lid member, said shoulder of said lid member being for frictionally engaging an interior surface of said open top end of said interior space of said housing for inhibiting inadvertent pivoting of said lid member with respect to said housing when said lid member is positioned over said open top end of said housing.

3. The urinal as set forth in claim 1, further comprising:

a handle member being coupled to said housing, said handle member being positioned proximate said lid member, said handle member being adapted for being gripped by a hand of the user for facilitating moving and positioning of said housing.

4. The urinal as set forth in claim 1, further comprising:

said housing comprising a bulbous portion and a tapered portion, said open top end of said interior space of said housing being positioned in an upper portion of said bulbous portion of said housing, said bulbous portion of said housing being adapted for receiving the scrotum of the user when the penis and the scrotum of the user are inserted into said interior space through said open top end of said interior space, said tapered portion being adapted for being positioned between the legs of the user when the user is urinating into said interior space of said housing.

5. A urinal for collecting urine from a user while the user is driving, the urinal comprising:

a housing comprising a perimeter wall, said perimeter wall defining an interior space of the housing, said interior space of said housing comprising an open top end, said open top end of said interior space being adapted for permitting insertion of the penis of the user into said interior space of said housing when the user needs to urinate such that said interior space of said housing is for collecting and storing the urine;

a lid member being hingably coupled to said housing, said lid member being for selectively pivoting over said open top end of said interior space of said housing to close said open top end for inhibiting leakage from said interior space of said housing;

a lid tab being coupled to said lid member, a housing tab being coupled to said housing adjacent said open top end of said interior space of said housing, said lid tab being hingably coupled to said housing tab such that said lid member is pivotal away from said housing for facilitating access to said open top end of said interior space of said housing;

said lid tab comprising a first aperture extending through said lid tab, said housing tab comprising a second aperture extending through said housing tab, said first aperture being aligned with said second aperture when said lid member is positioned over said open top end of said interior space of said housing such that said first aperture and said second aperture are adapted for receiving a hanging member for facilitating storage of said housing;

said lid member comprising a shoulder, said shoulder being positioned inwardly from an outer peripheral edge of said lid member, said shoulder of said lid member being for frictionally engaging an interior surface of said open top end of said interior space of said housing for inhibiting inadvertent pivoting of said lid member with respect to said housing when said lid member is positioned over said open top end of said housing;

a handle member being coupled to said housing, said handle member being positioned proximate said lid member, said handle member being adapted for being gripped by a hand of the user for facilitating moving and positioning of said housing; and said housing comprising a bulbous portion and a tapered portion, said open top end of said interior space of said housing being positioned in an upper portion of said bulbous portion of said housing, said bulbous portion of said housing being adapted for receiving the scrotum of the user when the penis and the scrotum of the user are inserted into said interior space through said open top end of said interior space, said tapered portion being adapted for being positioned between the legs of the user when the user is urinating into said interior space of said housing.

* * * * *